United States Patent
Akhteruzzaman et al.

(10) Patent No.: US 6,405,042 B1
(45) Date of Patent: Jun. 11, 2002

(54) PROVISION OF CELLULAR/WIRE-LINE SERVICE

(75) Inventors: Akhtar Akhteruzzaman, Naperville; Paul Raymond Sand, Woodridge; Richard Grant Sparber, Wheaton, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/497,601

(22) Filed: Feb. 3, 2000

(51) Int. Cl.[7] .............................. H04B 1/38; H04M 1/00
(52) U.S. Cl. ..................... 455/445; 455/557; 455/415; 455/433; 455/417; 379/130; 379/142
(58) Field of Search ................................ 455/556, 557, 455/550, 38.3, 343, 572, 573, 574, 415, 433, 417, 445; 379/130, 142

(56) References Cited

U.S. PATENT DOCUMENTS

| | | | | |
|---|---|---|---|---|
| 4,833,701 A | * | 5/1989 | Comroe et al. | 379/60 |
| 4,980,907 A | * | 12/1990 | Raith et al. | 379/63 |
| 5,251,248 A | * | 10/1993 | Tokunaga et al. | 379/58 |
| 5,315,637 A | * | 5/1994 | Breeden et al. | 379/58 |
| 5,438,609 A | * | 8/1995 | Yahagi | 379/58 |
| 5,467,381 A | * | 11/1995 | Peltonen et al. | 379/58 |
| 5,673,308 A | * | 9/1997 | Akhavan | 379/61 |
| 5,835,580 A | * | 11/1998 | Fraser | 379/115 |
| 5,878,115 A | * | 3/1999 | Valentine et al. | 379/59 |
| 5,926,760 A | * | 7/1999 | Khan et al. | 455/445 |

FOREIGN PATENT DOCUMENTS

| | | |
|---|---|---|
| EP | 0639034 | 2/1995 |
| EP | 0996272 | 4/2000 |
| WO | 9743864 | 11/1997 |

OTHER PUBLICATIONS

European Search Report for Application EP 01 30 0512, Dec. 17, 2001.

* cited by examiner

*Primary Examiner*—Edward F. Urban
*Assistant Examiner*—Marceau Milord
(74) *Attorney, Agent, or Firm*—Werner Ulrich

(57) ABSTRACT

Apparatus and a method for providing roaming service to a telecommunications station which can act as a cellular station or if plugged into a jack connected to a land-line switch, can act like a land-line telephone. When such a Universal Main Station (UMS) is plugged into a jack connected to a land-line switch, the station calls a server system which obtains the directory number corresponding to the jack into which the UMS was plugged. The server notifies a home switch of said UMS to forward calls to that directory number. When the UMS subsequently unplugs from the jack, the UMS registers as a mobile station and the home switch is notified to forward calls to the UMS, acting as a mobile station and identified by a secret directory number, identified in the course of the registration. Advantageously, this arrangement allows a mobile station equipped with an arrangement for detecting the presence of land-line power and arranged to substitute signals received from a jack for radio signals to roam widely, and to receive a choice of cellular service or land-line service wherever the station roams.

5 Claims, 3 Drawing Sheets

PROVISION OF CELLULAR/WIRE-LINE SERVICE

RELATED APPLICATION

This Application is related to an Application entitled, "A Universal Telephone Station for Telephone Roamers" by the inventors of this Application, being assigned to the same assignee and being filed concurrently.

TECHNICAL FIELD

This invention relates to the provision of roaming telecommunications service.

Problem

Roaming wireless cellular telecommunications service is a very popular and widely used service. It allows users to take a cellular telephone and originate calls from that telephone even when they are far away from their home location. An elaborate infrastructure has been created which makes this kind of service possible. It includes the provision of a Home Location Register (HLR) associated with a Main Station (MS), a user's home Mobile Switching Center (MSC), and a Visitor Location Register (VLR) associated with an MSC serving the customer, when the customer is outside the serving area of the home MSC. When a customer registers in a remote MSC, a VLR is assigned to that customer, and the HLR of the customer is informed of this assignment and the identity of the VLR. Calls to the roaming MS are routed initially to the home MSC, which upon consulting its HLR and the VLR for the called MS, routes the call to the remote MSC now serving the MS.

A problem with the prior art is that, while this arrangement is satisfactory for wireless stations, it does not solve the problems of providing incoming and outgoing service to customers who prefer to use wire-line service because, in general, it is much less expensive while away from their home wire-line switch, or because they are in an area where radio signals are too weak.

Solution

Applicants have further analyzed the various problems that are associated with providing roamer-like service to land-line customers. In accordance with their invention, a Universal Main Station (UMS) is provided capable of operating as a wireless station, but also capable of being plugged into a jack connected via local loop to a wire-line switch, and thereby operating as a wire-line Main Station; when such a UMS is plugged into a jack other than the home jack of that UMS, a connection is established to a server, which receives a mobile identification number transmitted by the UMS. If the directory number of the owner of the jack is not automatically forwarded via an Incoming Calling Line Identifier (ICLID) message, then the user of the UMS is prompted by the server to provide that directory number. The server then informs the home land-line switch that all calls to the directory number of the UMS are to be forwarded to the directory number of the owner of the jack into which the UMS has been plugged. When a UMS is unplugged from a jack, it automatically becomes a wireless MS, and automatically registers in the manner well known for cellular systems. The UMS in addition to having a land-line directory number, also has a secret cellular directory number, and all incoming calls to the UMS, while that station is in the wireless mode are automatically transmitted initially to the home land-line switch, and then forwarded to whichever cellular switch is presently serving the UMS, the forwarding being done using the secret telephone number of the UMS acting as a wireless station. Advantageously, this arrangement allows a single Main Station to be used alternately as a wire-line station or a wireless station, and allows that station to plug into any jack in the land-line Public Switched Telephone Network (PSTN), and be reachable at that location.

DETAILED DESCRIPTION

Figure 1:
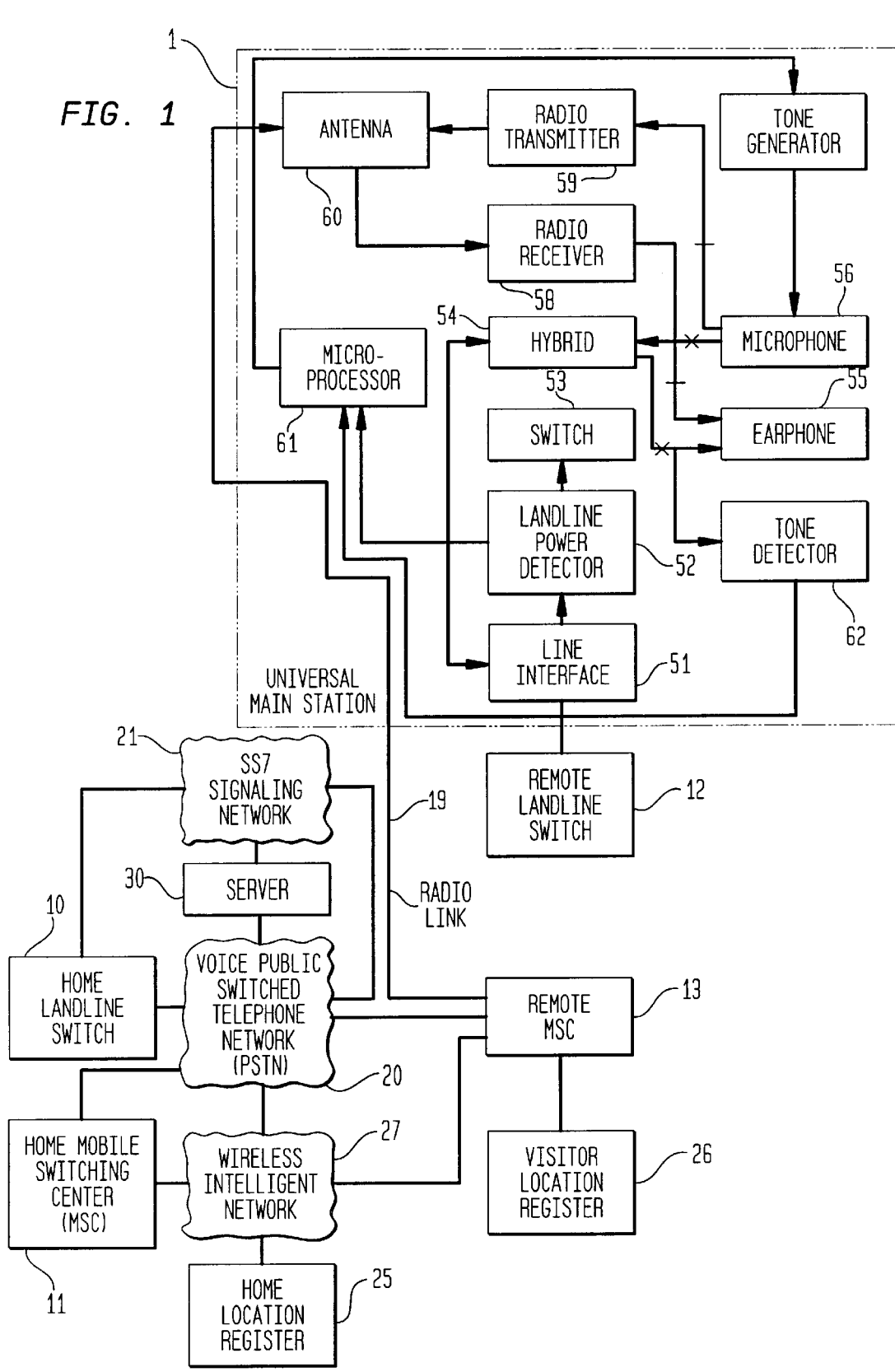
FIG. 1 is a block diagram, illustrating the basic attributes of Applicants' invention.

FIG. 1 is a block diagram, illustrating the basic attributes of Applicants' invention. A Universal Main Station (UMS) 1 is shown, which though normally connected to home land-line switch 10, can be plugged into jack connected via line 9 to remote land-line switch 12. The UMS can also be disconnected from any land-line service, and can, for example, be served via a radio link 19 from a remote Mobile Switching Center (MSC) 13, even though under normal circumstances, it would be served if unplugged from home land-line switch 10, by home MSC 11. UMS 1 includes a detector 52 for detecting the presence of 48-Volt power on tip and ring leads connected to a jack in UMS 1. UMS 1 is connected from MSC 13 or land-line switch 12 through the Public Switched Telephone Network (PSTN) 20 to home land-line switch 10. Signaling messages are transmitted through SS7 Signaling Network 21.

UMS 1 is an enhanced cellular telephone station, including a microprocessor for such a station. The microprocessor is enhanced with certain additional programs. In addition, UMS 1 has a hybrid circuit 54 so that it can accept two wire signals from a land-line switch as well as the 4-wire signals from radio signals for communicating with a base station. When the UMS is plugged into a wire-line jack, detector 52 detects the presence of 48-Volt power, and initiates an autonomous registration procedure. The autonomous registration procedure includes a call to a server 30, which may be reached, for example, by an "800" number, (similar to the arrangement for reaching AT&T Operator services by dialing 1-800-CALL-ATT). The UMS out-pulses its mobile identification number or any other appropriate identification number stored in the UMS to the server. In addition, the server normally receives the directory number associated with the jack into which the telephone has plugged by an incoming calling line identification (ICLID) message. In case this message is not present, (e.g., if the owner of the jack has suppressed ICLID signals, or if the remote land-line switch is not equipped to transmit ICLID signals), the server would alert the UMS, and an announcement would ask the UMS user to input the directory number of the jack to which the UMS is now connected.

On disconnect, the detector 52 detects the change to absence of 48-Volt power, and immediately initiates a cellular registration process by the UMS. Visitor Location Register (VLR) 26 used for securing the remote cellular UMS 1, notifies Home Location Register (HLR) 25 of the registration. A stand-alone HLR 25 is accessed via wireless intelligent network 27. If the HLR is incorporated in the MSC, it is accessed via the MSC. The HLR of the UMS customer is enhanced to recognize cellular registration by a UMS, and in case of such a registration, to forward a secret cellular directory number of the UMS customer to the home land-line switch 10, in order that incoming calls to the UMS are automatically forwarded to the UMS. Note that since the HLR is not normally consulted on incoming calls to a land-line switch, the land-line switch must have a record of the UMS secret cellular directory number in order to forward incoming calls to that unit.

If the UMS is, for example, in a foreign country, and cannot readily access the server via the standard 800-number, the UMS can still register by calling the server through some agreed upon access number, and then inputting the appropriate data in response to prompts. The data for the UMS mobile identification number can be supplied through use of an appropriate function key.

FIG. 1 shows further details of UMS 1. For the wire-line connection, UMS 1 has a line interface 51 which can be plugged into a jack connected, for example, to line 9. The line interface is connected to hybrid 54, whose output is connected to earphone 55, and whose input is connected to microphone 56. The line interface is also connected to land-line power detector 52 for detecting the presence of land-line power. Land-line power detector 52 controls switch 53. When switch 53 is in the operated position, the hybrid is connected to the microphone and earphone. When switch 53 is released, the earphone and microphone are connected to radio receiver 58, and radio transmitter 59, respectively. The radio receiver and transmitter are connected to antenna 60, which communicates for example, via radio link 19 with a remote MSC 13. UMS 1 is controlled by a microprocessor 61 which stores the identification number of UMS 1. Microprocessor 61 also controls tone generator 57, which is used for transmitting Dual-Tone-Multi-Frequency (DTMF) signals to the server 30. Microprocessor 61 can also receive signals via tone detector 62 connected to hybrid 54.

Note that if the customer is not interested in using a combined cellular land-line station, the antenna radio transmitter/radio receiver can be eliminated. The switch can also be eliminated and the earphone and microphone permanently connected to the hybrid.

Figure 2:
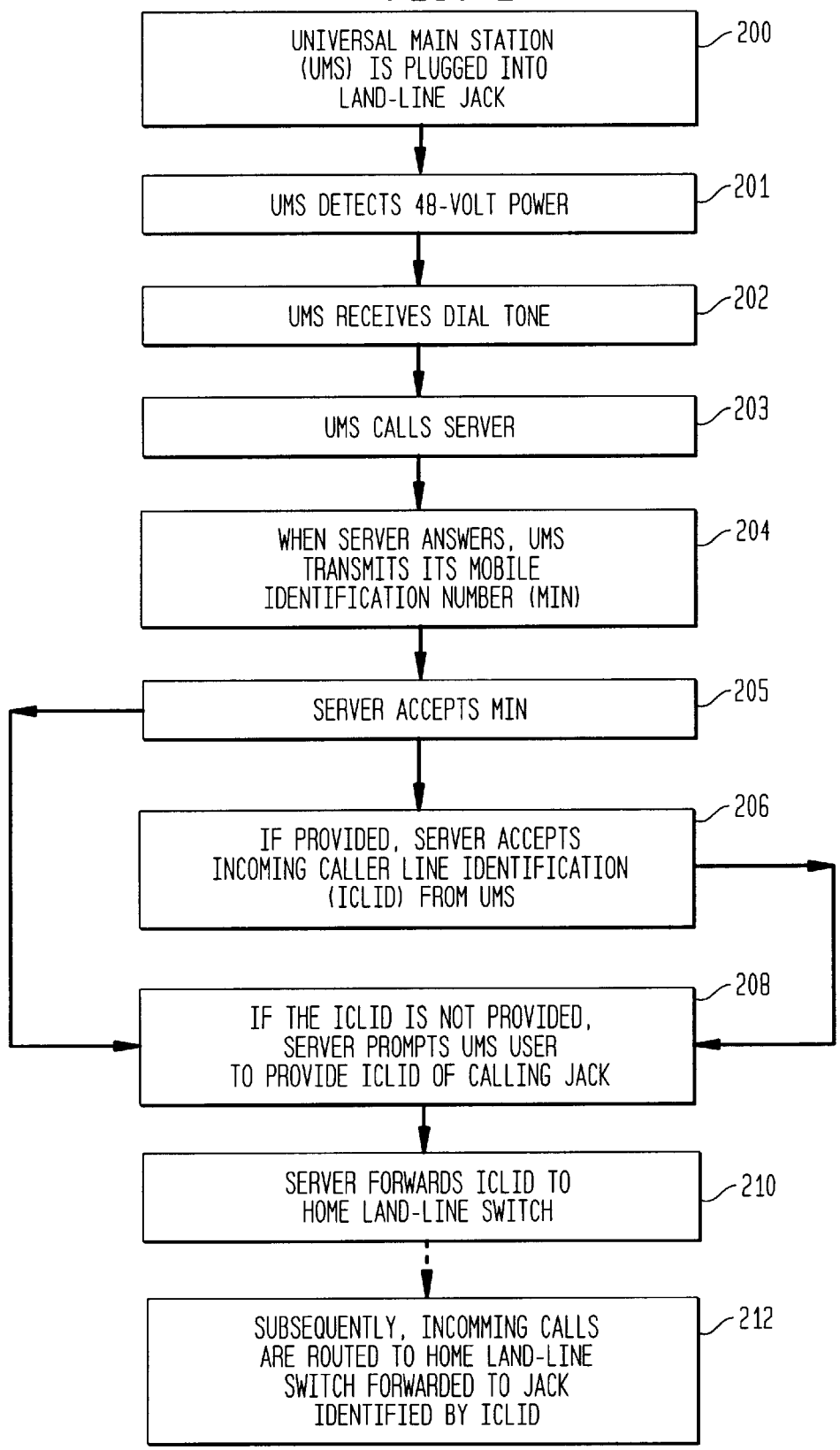
FIG. 2 is a flow diagram, illustrating operations performed when a UMS is plugged into a land-line jack.

FIG. 2 is a flow diagram, illustrating operations performed when a UMS is plugged into a land-line jack. The UMS is plugged into the land-line jack, (Action Block 200), detects 48-Volt power, (Action Block 201), and automatically waits until it receives dial-tone, (Action Block 202). The UMS automatically, (or optionally, manually), calls a server, (Action Block 203). When the server answers, the UMS transmits its mobile identification number. Optionally, a password procedure can be used wherein a password is either stored in the telephone station, or must be entered by the subscriber. The server accepts the UMS mobile identification number, (Action Block 204). If provided, the server accepts the ICLID of the calling jack, (Action Block 206). If ICLID is not provided, the server requests the directory number of the calling jack, and the UMS user provides this directory number, (Action Block 208). The server then forwards the directory number of the jack to the home UMS serving switch, (Action Block 210). Thereafter, incoming calls to the UMS are routed initially to the home land-line switch, and forwarded to the directory number of the jack into which the UMS is plugged, (Action Block 212).

Figure 3:
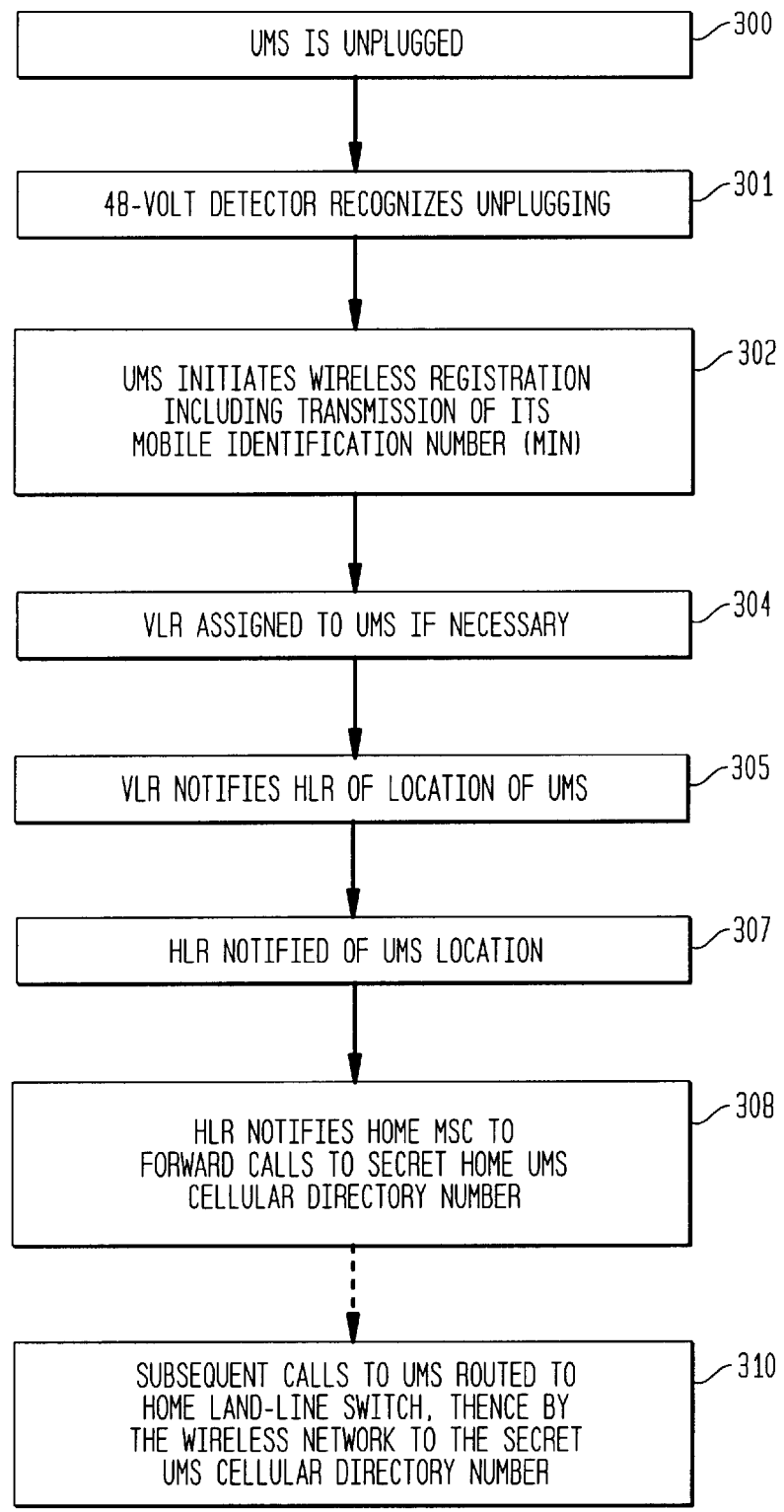
FIG. 3 is a flow diagram, illustrating operations performed when a UMS is unplugged from a land-line jack.

When a UMS is unplugged, (Action Block 300, FIG. 3), this is detected by the 48-Volt detector of the UMS, (Action Block 301). The UMS immediately initiates a registration procedure, including transmission of its mobile identification number, (Action Block 302). A VLR, such as VLR 26 (FIG. 1), is assigned to the UMS if the UMS is not in its home area, (Action Block 304), and the VLR, or, if the MS is in its home area, the home MSC, notifies the HLR of the location of the UMS, (Action Block 304). The HLR which knows the secret cellular directory number corresponding to a mobile identification number of a UMS, notifies the home land-line switch to forward all calls to the UMS to the secret cellular directory number of the UMS , (Action Block 308). Thereafter, all calls to the UMS are initially directed to the home land-line switch, and then forwarded via the wireless telephone network to the UMS as identified by its secret telephone number, and as located by its VLR, (Action Block 310).

The above description is of one preferred embodiment of Applicants' invention. Many other embodiments will be apparent to those of ordinary skill in the art without departing from the scope of the invention. Applicants' invention is limited only by the attached Claims.

What is claimed is:

1. A method of providing telephone service to a telephone Main Station (MS) from and to an arbitrary land-based location not served by a home switch for said MS, comprising the steps of:
   if said MS detects a connection to land-line power from a jack not served by said home switch, calling a server;
   transmitting to said server, a secret mobile identification number of said Main Station (MS);
   transmitting to said server an incoming calling line identification (ICLID) of said jack serving said MS;
   the server transmitting the directory number of said jack to said home switch serving said MS;
   routing an incoming call for said MS to said home switch; and
   automatically forwarding said incoming call to the MS from said home switch to said directory number;
   wherein said home switch is a home land-line switch for providing service to said MS whenever said MS is plugged into a land-line jack for said MS connected to said home land-line switch.

2. If said server does not automatically receive said ICLID, transmitting an indication from said server to said MS requesting said MS to provide said directory number.

3. The method of claim 2, wherein responsive to receiving said indication, a user of said MS provides said directory number to said server.

4. The method of claim 1, further comprising the steps of:
   detecting when said MS is unplugged by detecting the absence of land-line power;
   initiating a wireless registration procedure from said MS;
   responsive to said registration, notifying said home switch to forward calls to said MS to a secret cellular directory number of said MS.

5. The method of claim 1, wherein said MS has a land-line directory number served by said home switch, and a secret cellular directory number for calling said MS when said MS is powered-up and not connected to a land-line terminal.

* * * * *